(12) United States Patent  (10) Patent No.: US 8,202,050 B2
Caffrey  (45) Date of Patent: Jun. 19, 2012

(54) WIND TURBINE WITH WIRELESS PITCH CONTROL

(75) Inventor: Paul O. Caffrey, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 1076 days.

(21) Appl. No.: 12/117,797

(22) Filed: May 9, 2008

(65) Prior Publication Data

US 2009/0280012 A1  Nov. 12, 2009

(51) Int. Cl.
*F03D 7/00* (2006.01)

(52) U.S. Cl. .......... 416/3; 416/17; 416/30; 416/48; 416/147

(58) Field of Classification Search ............ 416/1, 3, 416/17, 30, 48, 147; 290/44, 55
See application file for complete search history.

(56) References Cited

U.S. PATENT DOCUMENTS

| 4,321,476 A * | 3/1982 | Buels ............... 290/55 |
| 7,126,236 B2 | 10/2006 | Harbourt et al. |
| 2007/0126241 A1* | 6/2007 | Olson ............... 290/55 |
| 2007/0132247 A1* | 6/2007 | Galayda et al. ......... 290/44 |

FOREIGN PATENT DOCUMENTS

| DE | 102005018996 | 10/2006 |
| DE | 202005011896 | 11/2006 |
| WO | 2004111443 | 12/2004 |

* cited by examiner

*Primary Examiner* — Igor Kershteyn
(74) *Attorney, Agent, or Firm* — William F. Heinze; Ernest G. Cusick; Frank A. Landgraff

(57) ABSTRACT

A wind turbine includes wireless system for receiving a control signal at a hub of the wind turbine.

2 Claims, 3 Drawing Sheets

WIND TURBINE WITH WIRELESS PITCH CONTROL

BACKGROUND OF THE INVENTION

1. Technical Field

The subject matter described here generally relates to wind turbines, structures, and, more particularly, to wind turbines with wireless pitch control.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a hub to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18. For example, as disclosed in commonly-owned U.S. patent application Ser. No. 10/554,610 filed on Oct. 26, 2005 published as International Patent Publication No. Application No. WO2004111443), the control system 16 may include a shut down control unit for shutting down the rotor, and receiving unit for operatively connected to the shut down control unit for receiving a wireless remote shutdown command signal.

The blades 10 generate lift and capture momentum from moving air that is them imparted to a rotor as the blades spin in the "rotor plane." Each blade is typically secured at its "root" end, and then "spans" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade. The length of the chord fine is simply the "chord."

"Angle of attack" is a term that is used in to describe the angle between the chord line of the blade 10 and the vector representing the relative motion between the blade and the air. "Pitching" refers to rotating the angle of attack of the entire blade 10 into or out of the wind in order to control the rotational speed and/or absorption of power from the wind. For example, pitching the blade "towards feather" rotates of the leading edge of the blade 10 into the wind, while pitching the blades "towards stall" rotates the leading edge of the blade out of the wind.

For so-called "pitch controlled" wind turbines, the pitch may be adjusted each time the wind changes in order to maintain the rotor blades at the optimum angle and maximize power output for all wind speeds. For example, the control system 16 may check the power output of the turbine 2 several times per second. When the power output becomes too high, the control system 16 then sends a signal to the blade pitch mechanism (not shown) which causes the blades 10 to be pitched slightly out of the wind. The blades 10 are then turned back into the wind when the wind speed slows down.

Commonly-assigned U.S. Pat. No. 7,126,236 discloses "Methods and Apparatus for Pitch Control Power Conversion" and is incorporated by reference here and reproduced in FIG. 2 where the control system 16 (from FIG. 1) includes one or more controllers within control panel 112 for overall system monitoring and control including pitch and speed regulation, high-speed shaft and yaw brake application, yaw and pump motor application and fault monitoring. However, alternative distributed or centralized control architectures are also used in some configurations.

The control system 16 provides control signals to the variable blade pitch drive or actuator 114 to control the pitch of blades 10 (FIG. 1) that drive hub 110. The drive train 8 (FIG. 1) of the wind turbine 2 includes a main rotor shaft 116 (also referred to as a "low speed shaft") connected to hub 110 and a gear box 12 that, in some configurations, utilizes a dual path geometry to drive a high speed shaft enclosed within gear box. A high speed shaft from the opposite end of the gear box is used to drive a first generator 120. In some configurations, torque is transmitted via a coupling 122.

The blade pitch control signals are typically provided in the form of electrical impulses signals from the control system 16 that are carried along wires extending through a hole at the center of the shaft 116 from a slip ring attached to the back of the gearbox 12. However, the rotating connection provided by the slip ring can distort that control signal, especially when the slip ring becomes worn or misaligned. Further information about slip rings is available in commonly-assigned U.S. patent application Ser. No. 11/838,438 for "Wind Turbine Assemblies and Slip Ring Assemblies for Wind Blade Pitch Control Motors" which is also incorporated by reference here.

BRIEF DESCRIPTION OF THE INVENTION

These and other drawbacks associated with such conventional approaches are addressed here in by providing, in various embodiments, a wind turbine including a wireless system for receiving a blade pitch actuator control signal at a hub of the wind turbine.

BRIEF DESCRIPTION OF THE DRAWINGS

Various aspects of this technology will now be described with reference to the following figures ("FIGS.") which are not necessarily drawn to scale, but use the same reference numerals to designate corresponding parts throughout each of the several views.

DETAILED DESCRIPTION OF THE INVENTION

Figure 1:
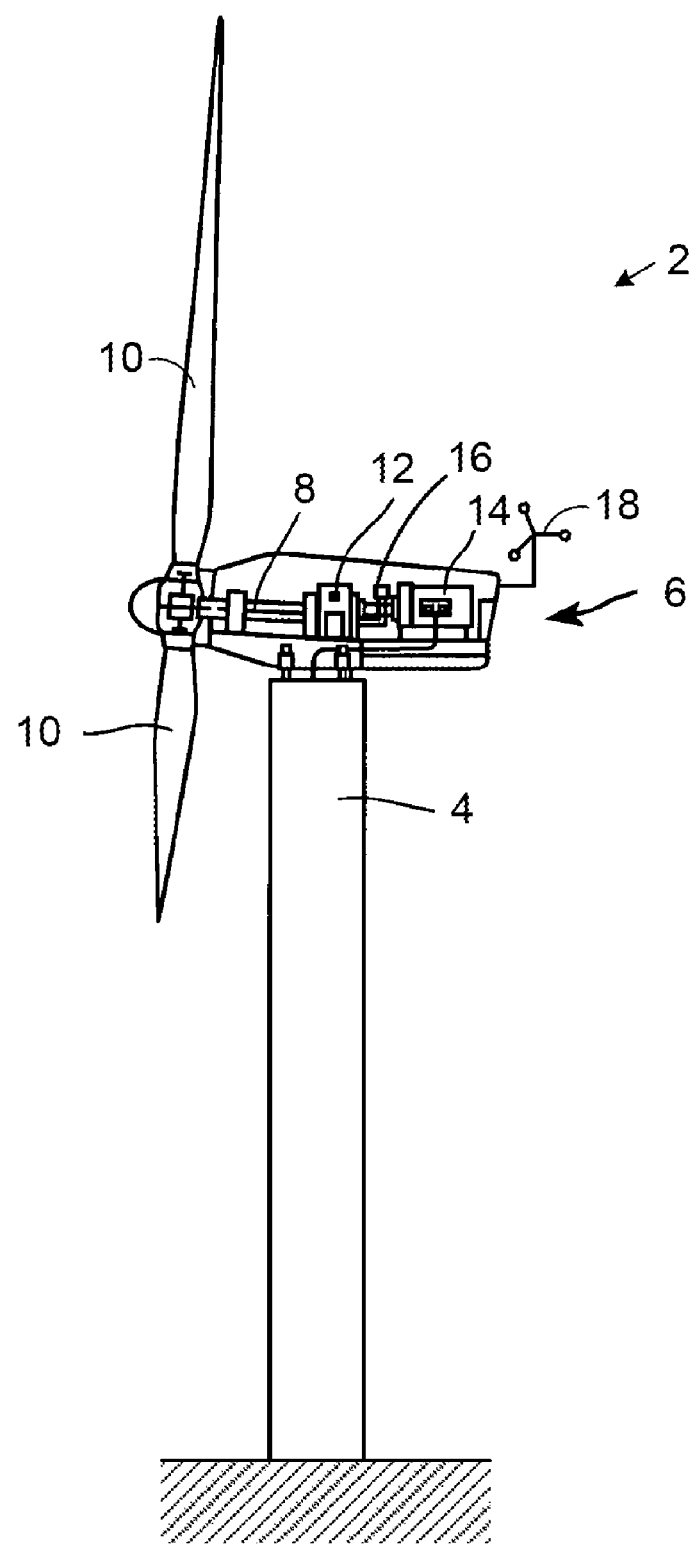
FIG. 1 is a schematic side view of a conventional wind generator.
Figure 2:
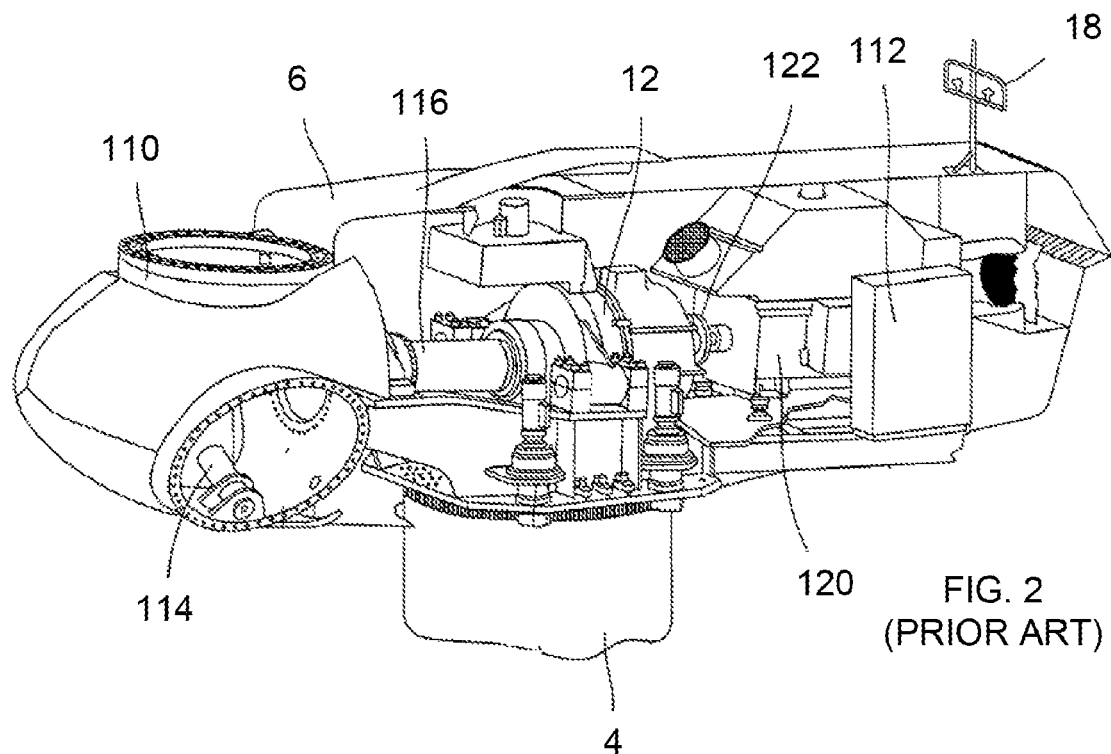
FIG. 2 is a cut-away orthographic view of the nacelle and hub of the conventional wind generator shown in FIG. 1.
Figure 3:
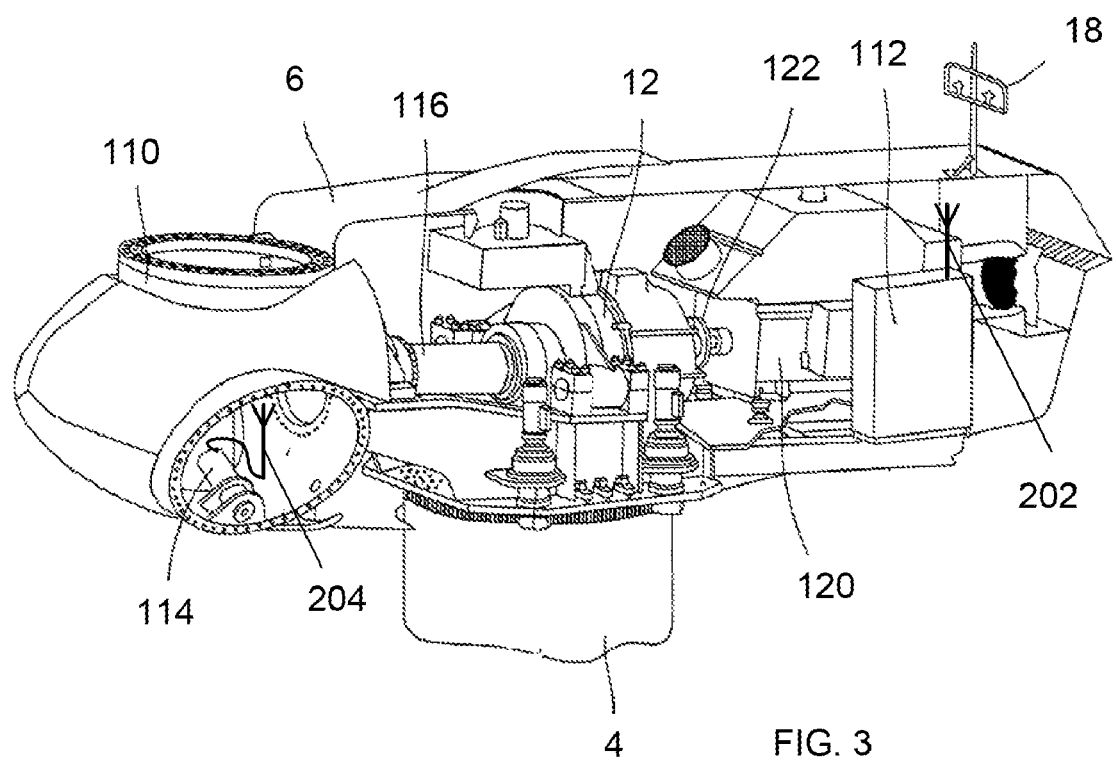
FIG. 3 is a cut-away orthographic view of a nacelle and hub for use with the wind generator shown in FIG. 1.

FIG. 3 illustrates one example of a wireless system for communicating a control signal, such as a blade pitch actuator and/or other control signals, to the hub 110 of the wind turbine. Although a radio communication system is illustrated in FIG. 3, other wireless communication systems may also be implemented, including, but not limited to, sonic, ultrasonic, optical, microwave, and/or infrared communication systems.

For the example illustrated in FIG. 3, the blade pitch actuator control signal is transmitted from the control panel 112 via transmitter 202 to a corresponding receiver 204 arranged in or on the hub 114. However, the transmitter 202 and receiver 204 may also be configured as transceivers for additionally communicating signals in the reverse direction from the hub 114 to the control panel 112. Similarly, although the transmitter 202 is illustrated here as being arranged inside the nacelle 6, the transmitter 202 may also be arranged on the nacelle, on or in the tower 4, or remote from the wind turbine 2.

Figure 4:
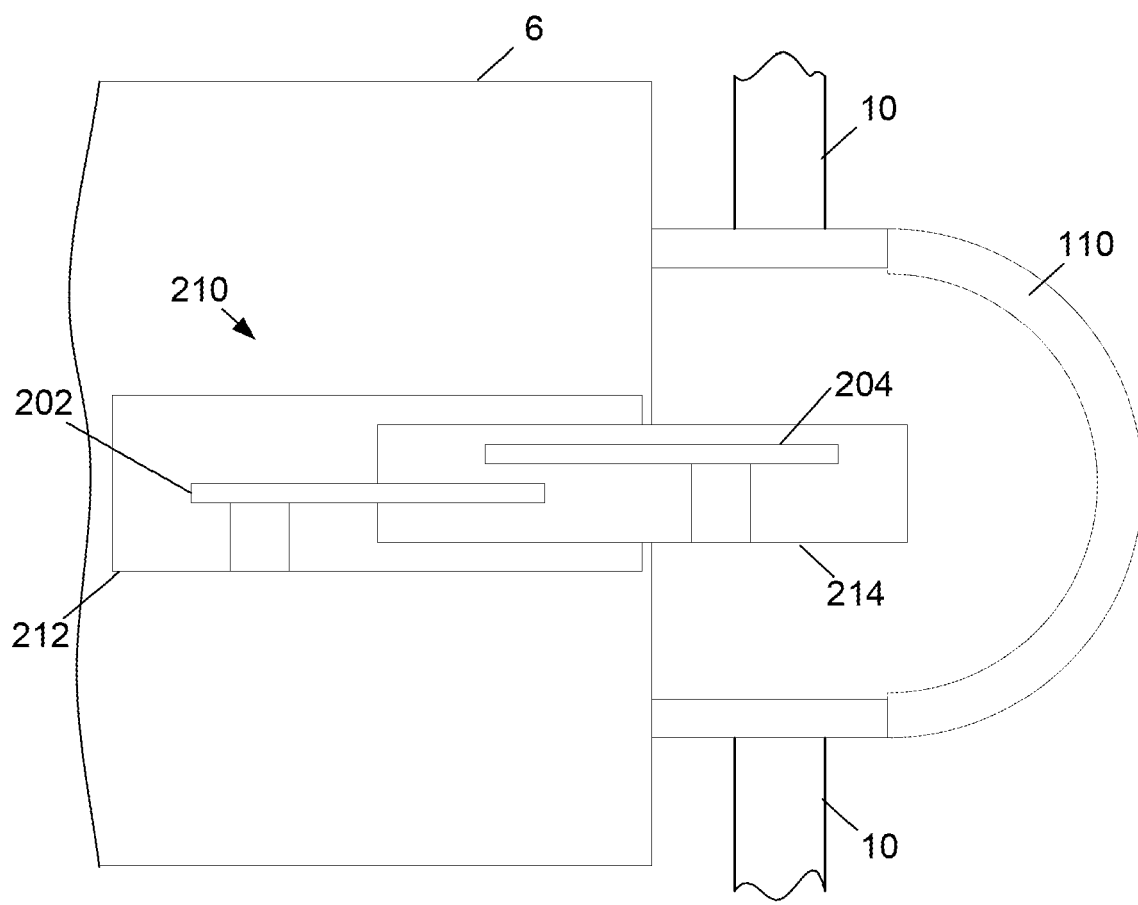
FIG. 4 is a schematic, partial side view of a wireless systems for communicating a control signal to a hub of a wind turbine.

FIG. 4 is a schematic, partial side view of a wireless systems for communicating a control signal to a hub of a wind turbine. In FIG. 4. the transmitter 202 and receiver 204 are arranged on a slip ring 210 having a stationary (outer) portion 212 arranged in the nacelle 6 and a rotating (inner) portion 214 arranged at least partially inside the hub 110. In this example, the stationary transmitter 202 arranged at one end of the stationary (outer) portion 212 of the slip ring 110 and points through the slip ring shaft. The rotating receiver 204 is attached to the rotating (inner) portion 214 of the slip ring 210 shaft and points towards the transmitter 202. Although this example illustrates the antennae ends of the transmitter 202 and receiver 204 being located such that they are within a few inches from each other, exact placement would not be critical to operation.

When configured for radio communication, the transmitter 202 and receiver 204 may communicate in a variety of protocols and at any frequency. For example, the communications may follow the IEEE 802.11 set of standards for wireless local area network computer communication in the 5 GHz and 2.4 GHz public spectrum bands, or the IEEE 801.16 set of standards in their current or future forms. In this regard, the transmitter 202 and receiver 204 may be provided with suitable routers, switches, and or hubs for integrating with any such local area network. Although the terms 802.11 and Wi-Fi are often used interchangeably, the Wi-Fi Alliance uses the term "Wi-Fi" to define a slightly different set of overlapping standards that may also be utilized here.

Wireless transmission communication of control signals to the hub offers a variety of advantages over conventional approaches. For example, it eliminates the need for wires extending through a hole at the center of the shaft 116, and therefore simplifies assembly and operation of the wind turbine 2.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A wind turbine, comprising:
   a tower;
   a nacelle arranged on the tower;
   a rotor, arranged at one end of the nacelle, having a hub for supporting at least one blade;
   a slip ring having a stationary portion arranged inside the nacelle and a rotating portion arranged at least partially inside the hub;
   a blade pitch actuator arranged in the hub; and
   a wireless system for communicating a control signal to the blade pitch actuator, wherein the wireless system comprises a stationary transmitter arranged in the nacelle and a rotating receiver attached to the rotating portion of the slip ring.

2. The wind turbine recited in claim 1, wherein the stationary transmitter is arranged at one end of the stationary portion of the slip ring.

* * * * *